United States Patent
Li et al.

(10) Patent No.: US 8,004,633 B2
(45) Date of Patent: Aug. 23, 2011

(54) MULTI-DOMAIN VERTICAL ALIGNMENT DISPLAY PANEL AND COLOR FILTER SUBSTRATE

(75) Inventors: De-Jiun Li, Taipei County (TW); Chun-Ming Huang, Tainan County (TW); Yen-Ju Chen, Taoyuan County (TW); Der-Chun Wu, Taipei County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 365 days.

(21) Appl. No.: 12/248,047

(22) Filed: Oct. 9, 2008

(65) Prior Publication Data

US 2009/0103020 A1  Apr. 23, 2009

(30) Foreign Application Priority Data

Oct. 23, 2007 (TW) ................................ 96139705 A

(51) Int. Cl.
*G02F 1/1335* (2006.01)
(52) U.S. Cl. ........................................ 349/106; 349/108
(58) Field of Classification Search ........................ None
See application file for complete search history.

(56) References Cited

U.S. PATENT DOCUMENTS

| | | | | |
|---|---|---|---|---|
| 6,501,521 B2 * | 12/2002 | Matsushita et al. | ........... | 349/106 |
| 6,596,141 B2 * | 7/2003 | Rasmussen | .................... | 204/490 |
| 6,783,813 B2 * | 8/2004 | You et al. | ......................... | 428/1.1 |
| 6,788,374 B2 | 9/2004 | Ko et al. | | |
| 7,136,140 B1 * | 11/2006 | Inoue et al. | .................... | 349/191 |
| 7,911,567 B2 * | 3/2011 | Roh et al. | ....................... | 349/106 |
| 2005/0024560 A1 * | 2/2005 | Yang et al. | ..................... | 349/114 |

FOREIGN PATENT DOCUMENTS

| | | |
|---|---|---|
| JP | 2001-209065 | 8/2001 |
| KR | 20070055821 | 5/2007 |
| KR | 1020070055821 A * | 5/2007 |

OTHER PUBLICATIONS

"1st Office Action of China counterpart application", issued on Oct. 9, 2009, p1-p5.

* cited by examiner

*Primary Examiner* — Michelle R Connelly Cushwa
(74) *Attorney, Agent, or Firm* — Jianq Chyun IP Office

(57) ABSTRACT

A color filter substrate including a base, a patterned color filter film layer, a common electrode layer and shelters is provided. The patterned color filter film layer is disposed on the base. Here, the patterned color filter film layer has recesses. Additionally, the patterned color filter film layer and the base are covered by the common electrode layer conforming to surfaces of the recesses. Moreover, the recesses and the common electrode layer are covered by the shelters.

9 Claims, 3 Drawing Sheets

MULTI-DOMAIN VERTICAL ALIGNMENT DISPLAY PANEL AND COLOR FILTER SUBSTRATE

CROSS-REFERENCE TO RELATED APPLICATION

This application claims the priority benefit of Taiwan application serial no. 96139705, filed on Oct. 23, 2007. The entirety of the above-mentioned patent application is hereby incorporated by reference herein and made a part of this specification.

BACKGROUND OF THE INVENTION

1. Field of the Invention

The present invention relates to a display panel, a color filter substrate, and fabricating methods thereof. More particularly, the present invention relates to a color filter substrate of a multi-domain vertical alignment (MVA) display panel.

2. Description of Related Art

Nowadays, a multimedia technology has been well developed, which mostly benefits from the progress of semiconductor devices and display apparatuses. As regards displays, liquid crystal displays (LCDs) with advantages of high definition, favorable space utilization, low power consumption and no radiation have gradually become the mainstream of the market. To allow a user to enjoy a better display quality, the LCDs aim at being characterized by high contrast ratio, no gray scale inversion, little color shift, high luminance, great color saturation, high responsive speed, wide viewing angle, and so on. From an aspect of the wide-viewing-angle technology, the common LCDs include in-plane switching (IPS) LCDs, twisted nematic (TN) LCDs, fringe field switching LCDs, multi-domain vertical alignment (MVA) LCDs, and the like.

FIG. 1 is a schematic cross-sectional view depicting a conventional MVA-LCD. Referring to FIG. 1, a conventional MVA-LCD 100 includes an active device array substrate 110, a color filter substrate 120, and a liquid crystal layer 130 disposed between the active device array substrate 110 and the color filter substrate 120. As shown in FIG. 1, the active device array substrate 110 mainly includes a substrate 111, an active device 112, and a pixel electrode 114. Specifically, the active device 112 is disposed on the substrate 111 and is electrically connected to the pixel electrode 114.

On the other hand, the color filter substrate 120 mainly includes a base 121, a plurality of black matrixes 122, a plurality of color film layers 124, a common electrode 126, and a plurality of protrusions P. The black matrixes 122 and the color film layers 124 are disposed on the base 121, and each of the black matrixes 122 is disposed between two of the color film layers 124. Besides, the common electrode 126 covers the black matrixes 122 and the color film layers 124. In particular, the protrusions P disposed on the common electrode 126 and slits S located on the pixel electrode 114 pose an impact on a distribution of an electric field between the pixel electrode 114 and the common electrode 126. Thereby, liquid crystal molecules of the liquid crystal layer 130 are further arranged in multi-directions, so as to obtain a number of different domains.

Note that the protrusions P on the color filter substrate 120 may affect an initial tilting condition of the liquid crystal molecules before the liquid crystal layer 130 is driven by the electric field. In general, the MVA-LCD 100 is usually configured to be in a normally black mode. Said configuration indicates that the liquid crystal molecules of the liquid crystal layer 130 are likely to affect the initial tilting condition of the liquid crystal molecules, thus giving rise to abnormal light leakage of a display image.

From another perspective, the color filter substrate 120 is mainly fabricated through utilizing several different photomask processes. For example, the fabrication of the black matrixes 122, a color film layer R, a color film layer G, a color film layer B, and the protrusions P on the color filter substrate 120 requires performing the photomask processes for five times. The number of times for which the photomask processes are performed influences manufacturing costs and manufacturing time of the entire MVA-LCD 100, and thus companies engaged in reduced the number of times for which the photomask processes are implemented. It is thus imperative to improve the fabricating process of the conventional color filter substrate 120.

SUMMARY OF THE INVENTION

The present invention is directed to a color filter substrate which is apt to be fabricated, further reducing manufacturing costs of the color filter substrate effectively.

The present invention is further directed to a MVA display panel characterized by a satisfactory display quality.

The present invention provides a color filter substrate including a base, a patterned color filter film layer, a common electrode layer and a plurality of shelters. The patterned color filter film layer is disposed on the base. Here, the patterned color filter film layer has a plurality of recesses. Additionally, the patterned color filter film layer and the base are covered by the common electrode layer conforming to surfaces of the recesses. Moreover, the shelters are disposed within the recesses and on the common electrode layer.

According to another embodiment of the present invention, the patterned color filter film layer includes a first patterned filter film layer, a second patterned filter film layer, and a third patterned filter film layer.

According to an embodiment of the present invention, the recesses are located in the first patterned filter film layer, the second patterned filter film layer, and the third patterned filter film layer.

According to an embodiment of the present invention, the recesses are located between adjacent two of the first patterned filter film layer, the second patterned filter film layer, and the third patterned filter film layer.

According to an embodiment of the present invention, a material of the shelters includes a mixture of resin and boron carbide.

According to an embodiment of the present invention, a material of the shelters includes a mixture of resin and silicon carbide.

According to an embodiment of the present invention, a material of the shelters includes a mixture of resin and tungsten carbide.

According to an embodiment of the present invention, a material of the shelters includes a mixture of resin and vanadium carbide.

The present invention further provides a MVA display panel including a MVA active device array substrate, a color filter substrate, and a liquid crystal layer. Here, the liquid crystal layer is disposed between the color filter substrate and the MVA active device array substrate. The MVA active device array substrate includes a substrate and a plurality of pixel units arranged in array on the substrate. Each of the pixel units includes at least an active device and a pixel electrode electrically connected to each other, and the pixel electrode has a plurality of slits. Moreover, the color filter substrate includes a base, a patterned color filter film layer, a common electrode layer and a plurality of shelters. The patterned color filter film layer is disposed on the base and has a plurality of recesses. Additionally, the patterned color filter film layer and the base are covered by the common electrode layer conforming to surfaces of the recesses. Note that the recesses and the common electrode layer are covered by the shelters.

The common electrode layer and the recesses of the color filter substrate are covered by the shelters according to the present invention. Thereby, the liquid crystal layer disposed between the color filter substrate and the MVA active device array substrate can be on a favorable initial condition of arrangement. Hence, the MVA display panel of the present invention is capable of preventing light leakage effectively and further improving display contrast of the image. As such, the desirable display quality can be achieved.

In order to make the aforementioned and other objects, features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

First Embodiment

FIGS. 2A through 2D are schematic cross-sectional flowcharts illustrating a fabricating method of a color filter substrate according to the present invention. First, referring to FIG. 2A, a base 202 is provided. Next, a first patterned filter film layer 204a is formed on the base 202 by performing a photomask process. Here, the first patterned filter film layer 204a has a plurality of recesses 205. Specifically, a material of the first patterned filter film layer 204a is red resin, for example.

Figure 2A:
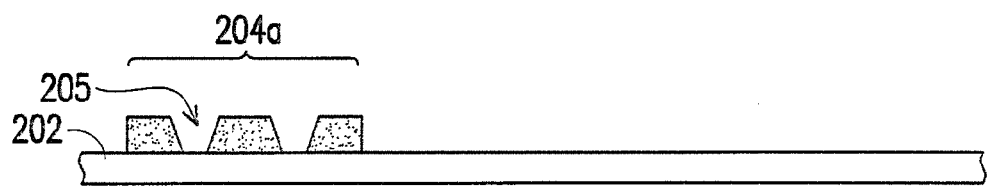
FIGS. 2A through 2D are schematic cross-sectional flowcharts illustrating a fabricating method of a color filter substrate according to the present invention.
Figure 2B:
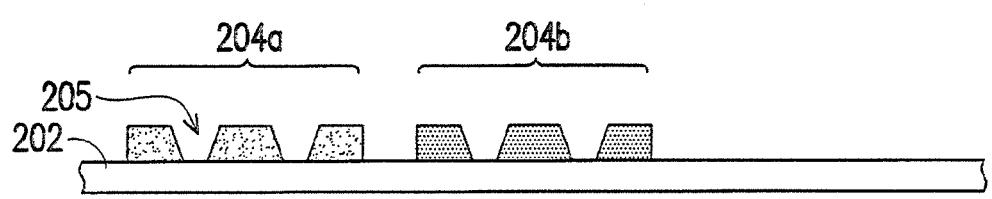

Next, referring to FIG. 2B, a second patterned filter film layer 204b is formed on the base 202 by performing another photomask process. Here, the second patterned filter film layer 204b has a plurality of the recesses 205. A material of the second patterned filter film layer 204b is, for example, green resin.

Figure 2C:
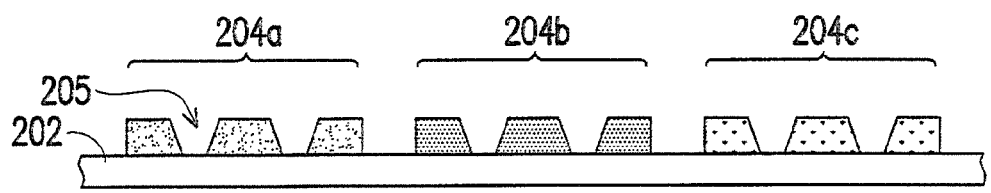

After that, referring to FIG. 2C, a third patterned filter film layer 204c is formed on the base 202. Here, the third patterned filter film layer 204c has a plurality of the recesses 205. In addition, the recesses 205 can also be disposed between adjacent two of the first patterned filter film layer 204a, the second patterned filter film layer 204b, and the third patterned filter film layer 204c.

In practice, a material of the third patterned filter film layer 204c is, for example, blue resin. It is of certainty that people skilled in the pertinent art should know the color of the resin applied to fabricate the first patterned filter film layer 204a, the second patterned filter film layer 204b, and the third patterned filter film layer 204c can be adjusted based on actual requirements, and thus the color is by no means limited in the present invention. So far, the first patterned filter film layer 204a, the second patterned filter film layer 204b, and the third patterned filter film layer 204c together construct the patterned color filter film layer 204 of the present invention.

Figure 2D:
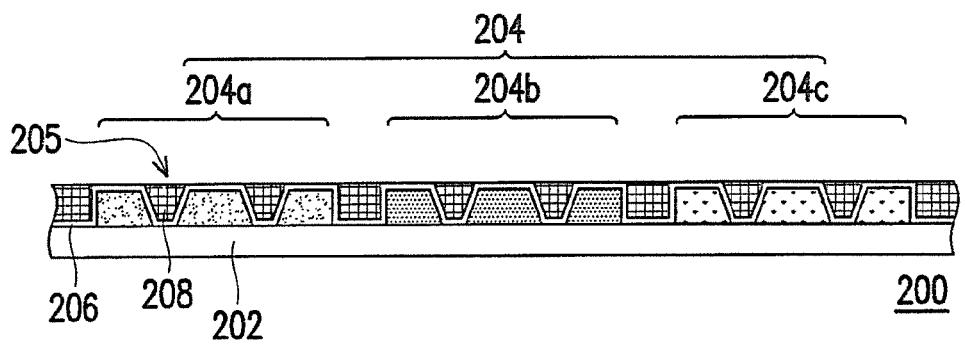

Afterwards, referring to FIG. 2D, a common electrode layer 206 is formed on the patterned color filter film layer 204. The common electrode layer 206 fills the recesses 205 and conforms to the same. Namely, through an exemplary thorough deposition, the common electrode layer forms a transparent conductive layer on the patterned color filter film layer 204. Practically, a material of the common electrode layer 206 includes indium tin oxide (ITO), indium zinc oxide (IZO), or aluminum zinc oxide (AZO).

Referring to FIG. 2D, the corresponding part of the common electrode layer 206 in the recesses 205 are covered by a plurality of shelters 208. Note that the shelters 208 fill the recesses 205 completely. In particular, a material with a comparatively low transmission can be first deposited on the common electrode layer 206 and patterned by performing one photomask process, so as to form the shelters 208. On the other hand, a dielectric constant of the shelters 208 ranges from 3 to 3.5 in general. A material of the shelters 208 can be selected from a mixture of resin and boron carbide, a mixture of resin and silicon carbide, a mixture of resin and tungsten carbide, or a mixture of resin and vanadium carbide.

Figure 1:
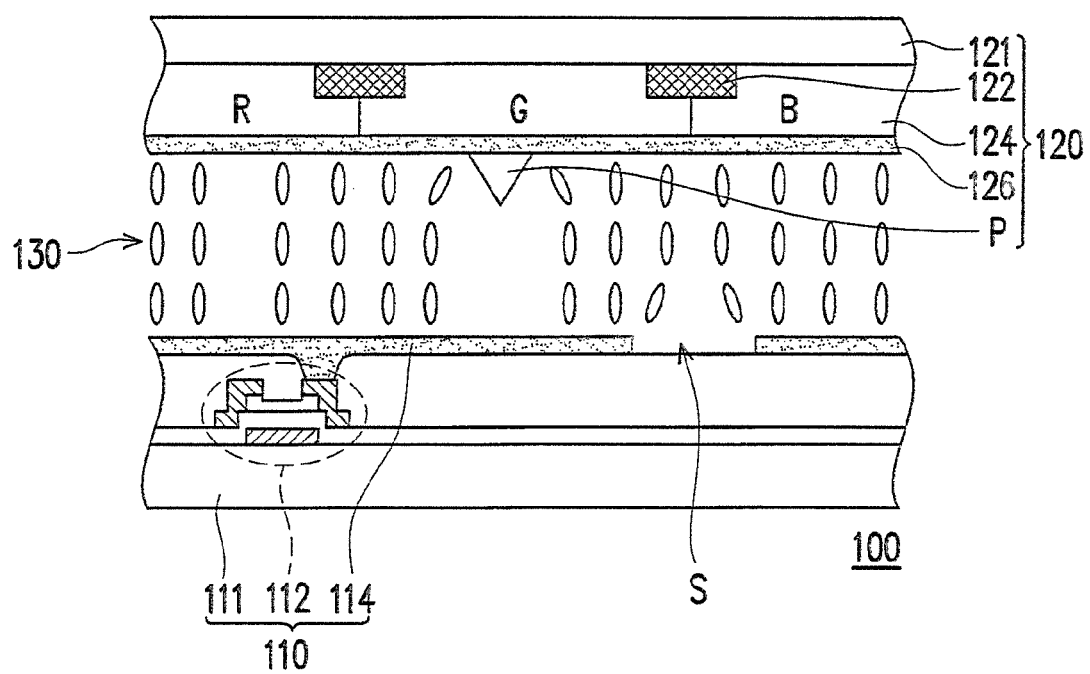
FIG. 1 is a schematic cross-sectional view depicting a conventional MVA-LCD.

The fabrication of the color filter substrate 200 of the present invention is so far completed. Namely, through implementation of the photomask processes merely for four times, the fabrication of the color filter substrate 200 of the present invention is completed. In comparison with the conventional color filter substrate 100 (as shown in FIG. 1) fabricated through implementing the photomask processes for five times, the color filter substrate can be fabricated through the fabricating method taught by the present invention, thus simplifying the manufacturing process and reducing the manufacturing costs.

Moreover, the color filter substrate 200 illustrated in FIG. 2D includes the base 202, the patterned color filter film layer 204, the common electrode layer 206 and a plurality of the shelters 208. The patterned color filter film layer 204 is disposed on the base 202. Here, the patterned color filter film 204 layer has a plurality of the recesses 205. Additionally, the patterned color filter film layer 204 is covered by the common electrode layer 206 conforming to surfaces of the recesses 205. Moreover, the shelters 208 are disposed on the common electrode layer 206 in the recesses 205. Note that the shelters 208 fill the recesses 205 completely. Said feature ensures a desirable display quality of the MVA display panel of the present invention, which will be elaborated in a second embodiment.

Second Embodiment

Figure 3:
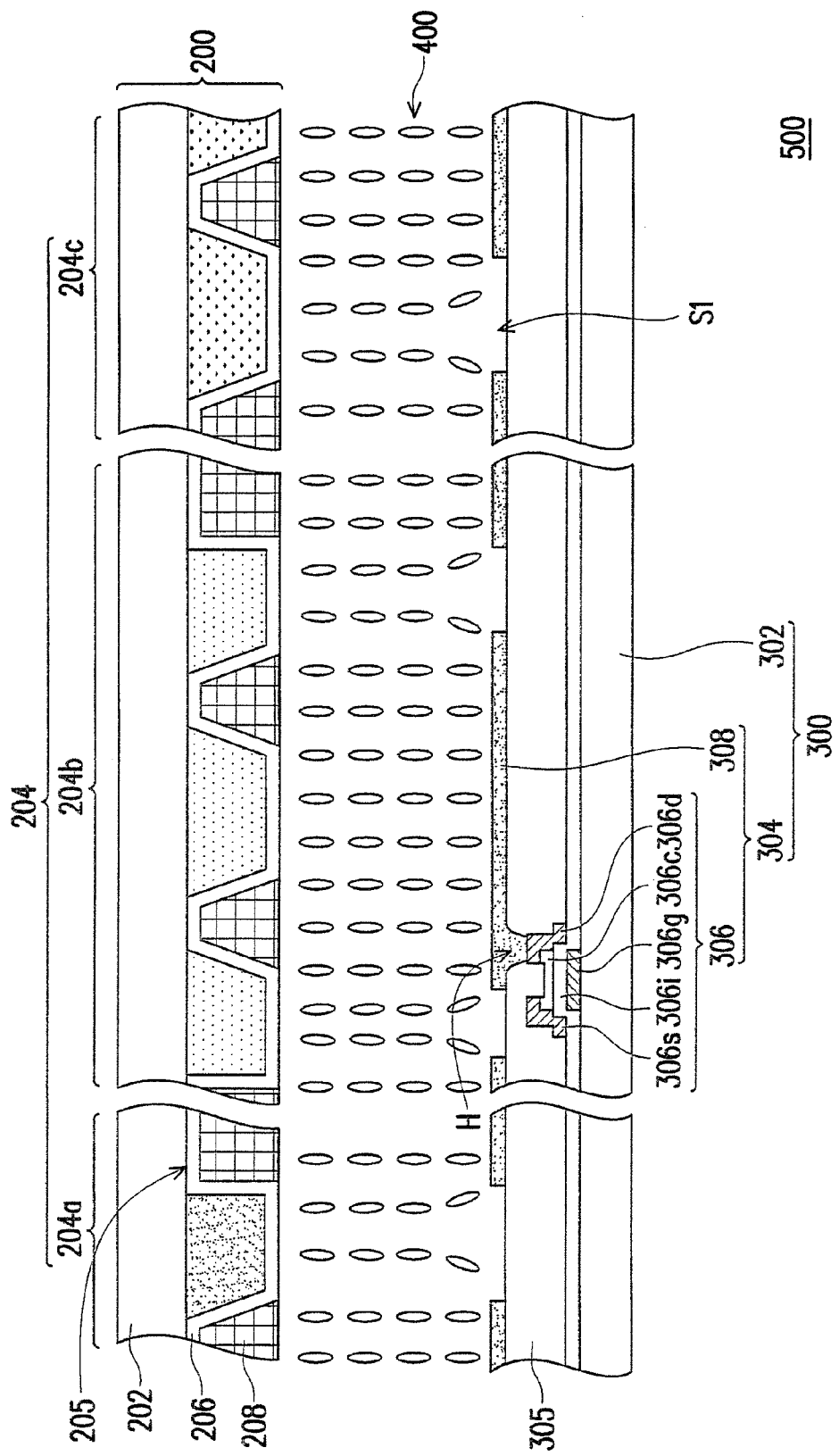
FIG. 3 is a schematic cross-sectional view depicting a MVA display panel according to the present invention.

FIG. 3 is a schematic cross-sectional view depicting a MVA display panel according to the present invention. Referring to FIG. 3, the color filter substrate 200 and a MVA active device array substrate 300 are provided. The description of the color filter substrate 200 is clearly disclosed in the first embodiment, and thus no further explanation is provided herein. Thereafter, a liquid crystal layer 400 is formed between the color filter substrate 200 and the MVA active device array substrate 300. Thereby, the MVA display panel 500 of the present invention can be completely fabricated.

The MVA display panel 500 shown in FIG. 3 mainly includes the color filter substrate 200, the MVA active device array substrate 300, and the liquid crystal layer 400. In detail, the MVA active device array substrate 300 includes a substrate 302 and a plurality of pixel units 304 arranged in array on the substrate 302. Each of the pixel units 304 includes at least an active device 306 and a pixel electrode 308 electrically connected thereto. Certainly, people skilled in the pertinent art should know that the number of the active device 306 is determined upon the design of the pixel units 304. For example, the pixel unit having a pre-charge design may require more than two active devices 306. Thus, the number of the active device 306 in each of the pixel units 304 is not limited herein.

For example, the active device 306 may have a bottom gate structure. The active device 306 mainly includes a gate 306g, a gate insulating layer 306i, a channel layer 306c, a source 306s and a drain 306d. The gate 306g is disposed on the substrate 302, and the gate insulating layer 306i covers the gate 306g. Moreover, the channel layer 306c is disposed on the gate insulating layer 306i above the gate 306g. The source 306s and the drain 306d are respectively disposed at two sides of the channel layer 306c.

On the other hand, the active device 306 is covered by a passivation layer 305 having a contact window H for exposing the drain 306d. Practically, the pixel electrode 308 can be electrically connected to the active device 306 through the contact window H. Note that the pixel electrode 308 has a plurality of slits S1. The slits S1 pose an impact on a distribution of the electric field. Thereby, the driven liquid crystal molecules in the liquid crystal layer 400 are arranged in multi-directions, and thus a relatively wide viewing angle of the display image is accomplished.

Furthermore, the patterned color filter film layer 204 of the color filter substrate 200 in the present invention has a plurality of the recesses 205, and the common electrode layer 206 conforms to the surfaces of the recesses 205. In other words, the common electrode layer 206 located at the recesses 205 affects the distribution of the electric field as well, such that the driven liquid crystal molecules in the liquid crystal layer 400 are effectively arranged in multi-directions. It should be noticed that the shelters 208 fill the recesses 205 completely. As indicated in FIG. 3, a surface of the common electrode layer and the surfaces of the shelters 208 are substantially on the same extending plane.

In the event that a normally black mode MVA display panel 500 is taken for example, the liquid crystal molecules in the liquid crystal layer 400 are not on an unsatisfactory tilting condition before the liquid crystal molecules are driven, for the shelters 208 completely fill the recesses 205. Thereby, the abnormal light leakage can be effectively prevented. Furthermore, the contrast of the display image can be greatly improved.

In light of the foregoing, the common electrode layer and the recesses are covered by the shelters in the color filter substrate of the present invention. Thereby, the liquid crystal layer disposed between the color filter substrate and the MVA active device array substrate can be on a favorable initial condition of arrangement. Hence, the MVA display panel of the present invention is not only capable of preventing the abnormal light leakage, but also able to improve the contrast of the display image. As such, the desirable display quality can be achieved. Moreover, the fabricating method of the color filter substrate in the present invention can effectively reduce the number of times for which the photomasks are used, thus reducing the manufacturing costs of the color filter substrate.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A color filter substrate, comprising:
   a base;
   a patterned color filter film layer disposed on the base, wherein the patterned color filter film layer has a plurality of patterned filter film layer in different color, the patterned filter film layer in the same color has a plurality of recesses, and the bottom size of each recess in the same color patterned filter film layer is smaller than the top size of the recess;
   a common electrode layer covering the patterned color filter film layer and the base, the common electrode layer conforming to surfaces of the recesses; and
   a plurality of shelters disposed within the recesses and on the common electrode layer.

2. The color filter substrate according to claim 1, wherein the patterned color filter film layer comprises a first patterned filter film layer, a second patterned filter film layer, and a third patterned filter film layer.

3. The color filter substrate according to claim 2, wherein the recesses are located in the first patterned filter film layer, the second patterned filter film layer, and the third patterned filter film layer.

4. The color filter substrate according to claim 2, wherein the recesses are located between adjacent two of the first patterned filter film layer, the second patterned filter film layer, and the third patterned filter film layer.

5. The color filter substrate according to claim 1, wherein a material of the shelters comprises a mixture of resin and boron carbide.

6. The color filter substrate according to claim 1, wherein a material of the shelters comprises a mixture of resin and silicon carbide.

7. The color filter substrate according to claim 1, wherein a material of the shelters comprises a mixture of resin and tungsten carbide.

8. The color filter substrate according to claim 1, wherein a material of the shelters comprises a mixture of resin and vanadium carbide.

9. A multi-domain vertical alignment (MVA) display panel, comprising:
   a MVA active device array substrate; comprising:
      a substrate;
      a plurality of pixel units arranged in array on the substrate, wherein each of the pixel units comprises at least an active device and a pixel electrode electrically connected to each other, and the pixel electrode has a plurality of slits;
   a color filter substrate, comprising:
      a base;
      a patterned color filter film layer disposed on the base, wherein the patterned color filter film layer has a plurality of patterned filter film layer in different color, the patterned filter film layer in the same color has a plurality of recesses, and the bottom size of each recess in the same color patterned filter film layer is smaller than the top size of the recess;
      a common electrode layer covering the patterned color filter film layer and the base, the common electrode layer conforming to surfaces of the recesses;
      a plurality of shelters disposed within the recesses and on the common electrode layer; and
   a liquid crystal layer disposed between the color filter substrate and the MVA active device array substrate.

* * * * *